United States Patent [19]
Bonnefon

[11] 3,992,958
[45] Nov. 23, 1976

[54] TRANSMISSION BELT
[75] Inventor: Alain Bonnefon, Epinay sur Seine, France
[73] Assignee: Pneumatiques, Caoutchouc Manufacture et Plastiques Kleber-Colombes, France
[22] Filed: Nov. 21, 1974
[21] Appl. No.: 525,929

[30] Foreign Application Priority Data
Nov. 21, 1973  France .............................. 73.41371

[52] U.S. Cl. ............................... 74/231 R; 74/234
[51] Int. Cl.² ........................ F16G 1/00; F16G 5/00
[58] Field of Search .............. 74/231 P, 231 R, 234, 74/232, 233; 198/193

[56] References Cited
UNITED STATES PATENTS
2,802,511  8/1957  Waugh ........................... 74/231 R X
2,805,182  9/1957  Hallenbeck ................. 74/231 P UX
3,242,750  3/1966  Graft ...................................... 74/234
3,538,974  11/1970  Marzocchi ........................ 74/231 R FOREIGN PATENTS OR APPLICATIONS
907,157  10/1962  United Kingdom .............. 74/231 P Primary Examiner—Leonard H. Gerin
Attorney, Agent, or Firm—Craig & Antonelli

[57] ABSTRACT

A transmission belt which has a portion possessing tensile strength that consists solely of a thin, flat strip (sheathing) and that contains no reinforcing cord or cable. This strip comprises at least two thin, superposed layers bonded together and consisting of a flexible elastomer or plastomer matrix reinforced with irregular, elongated fibrils dispersed in the matrix with a dominant orientation in the longitudinal direction of the strip such that the strip has a tensile strength of at least 20 kg/cm² with 1% elongation.

15 Claims, 6 Drawing Figures

TRANSMISSION BELT

DESCRIPTION OF THE PRIOR ART

Transmission belts consisting of flexible elastomers or plastomers (polymer) are generally reinforced by a sheathing possessing tensile strength consisting of one or more fabric layers or textile cords embedded in the elastomer. The heterogeneity of such structure involves manufacturing complications in the preparation and assembly of the various elements. It can also produce variations in flexibility at certain points in the belts, thus causing vibrations as a function of high linear speeds.

SUMMARY OF THE INVENTION

The object of the present invention is to produce transmission belts in which the use of reinforcing sheathing in the form of cords or fabric layers is completely eliminated, thus enabling simple and economic belts to be produced which are homogeneous over their entire length.

According to the invention, the part or portion of the belt possessing tensile strength consists of a thin, flat strip comprising at least two thin superposed layers bonded together and consisting of a flexible elastomer or plastomer matrix reinforced with irregular elongated fibrils dispersed in the matrix with a dominant orientation in the longitudinal direction of the strip such that this strip has a tensile strength of at least 20 kg/cm$^2$ with 1% elongation. Preferably, the flexible elastomer or plastomer matrix is reinforced with at least 5% by weight of elongated fibrils consisting of a crystalline polyolefin having a high molecular weight equal to or greater than 500,000.

When the reinforcing fibrils are extremely fine and well dispersed, the mixture consisting of the elastomer or plastomer matrix and the fibrils has a homogeneous character on the macroscopic scale and it may be fashioned in the form of thin layers from which it is possible to produce reinforcing sheathings possessing tensile strength consisting of flat strips having a regular or uniform homogeneity section along their entire length.

The fibrils may be dispersed in the flexible matrix relatively easily by a mixing operation using a Bambury type internal mixer or a cylinder mixer such as those currently used in the rubber and plastic industry.

By simultaneously or subsequently subjecting the mixture to a drawing operation such as is obtained between the cylinders of a cylinder mixer or a calender, a more or less marked relative orientation of the fibrils according to a dominant direction parallel to the drawing direction is obtained. The finer the fibrils and the better their distribution in the matrix, the greater the homogeneity on the macroscopic scale of the mixture thus treated. When the reinforcing element consists of a crystalline polyolefin having a high molecular weight, the fibrils may be produced in situ in the matrix by carrying out the mixing operation at a temperature which is close to or higher than the melting point of the polyolefin in a mixing device such as a Bambury mixer or a cylinder mixer, the mixture being subjected to shearing forces which produce division of the polyolefin particles and the drawing out of a marked proportion of these particles which then form elongated fibrils which are ca. one micron in diameter and 2 – 20 mm. in length.

As indicated above, the strip-form reinforcing sheathing or portion possessing tensile strength of the belt consists of at least two thin, superposed layers bonded together and in this case, the reinforcing fibrils of these superposed layers are preferably oriented according to symmetrical, dominant directions forming angles of less than 10° with respect to the longitudinal direction of the strip.

The transmission belts in question may be in the form of thin, flat endless belts consisting essentially of a sheathing possessing tensile strength. The sheathing may also be bonded to an elastomer of plastomer base having a trapezoidal section, a multiple V section, or a denticulated (tooth-like) section to allow it to cooperate with grooved pulleys or denticulated pulleys.

Other objects, features and advantages of the present invention will be made apparent from the following detailed description of preferred embodiments thereof provided with reference to the accompanying drawings.

DESCRIPTION OF THE PREFERRED EMBODIMENTS

Figure 1:
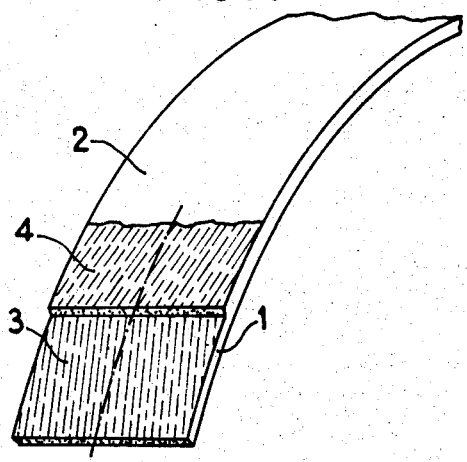
FIGS. 1 and 2 show perspective views with portions removed of flat strips utilizable as flat transmission belts.

In the case of FIG. 1, the flat transmission belt consists essentially of two thin, superposed layers 1 and 2 bonded together to form a flat, thin strip possessing tensile strength. Each layer 1, 2, consists of a rubbery mixture comprising a flexible elastomer or plastomer matrix in which elongated reinforcing fibrils are dispersed. These fibrils 3,4, possess a dominant orientation in each layer such that they are substantially parallel to each other and with the flat upper and lower faces of the layers. The directions of orientation of these fibrils are symmetrically inclined with respect to the longitudinal direction and they form angles with respect to this direction which are preferably less than 10°, for example, 3° – 5°.

Figure 2:
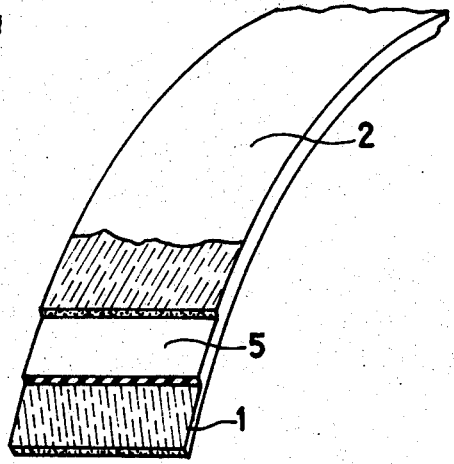

In the case of FIG. 2, the flat transmission belt is similar to that shown in FIG. 1, with the exception that the layers 1, 2, reinforced with oriented fibrils, are bonded together through the intermediary of a thin connecting layer 5 which does not contain reinforcing fibrils and consists of an elastomer or plastomer capable of adhering firmly to the layers 1 and 2.

The belts according to FIGS. 1 and 2 may be used just as they are as flat transmission belts between cylindrical or slightly curved pulleys. The symmetrical inclination of the reinforcing fibrils within the layers 1,2, ensures transversal distribution of the tensile stresses to which they are subject in operation and helps keep the layers in a good position on the pulleys.

Figure 3:
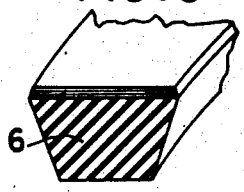
FIGS. 3, 4 and 5 show a trapezoidal belt section, a multiple V section and a denticulated belt section with a reinforcing sheathing or portion according to the invention.
Figure 4:
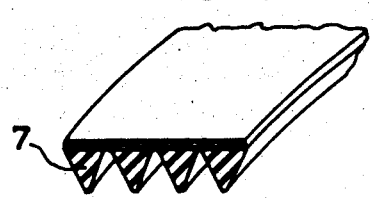
Figure 5:
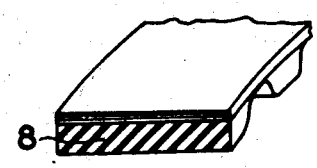

These belts may also be used as a sheathing possessing tensile strength in other types of belts. In this case, one of the faces of the flat sheathing is bonded to an elastomer or plastomer base having a trapezoidal section 6 (FIG. 3), or a multiple V base 7 (FIG. 4), or even a denticulated base 8 (FIG. 5), to allow them to cooperate respectively with pulleys having trapezoidal grooves, pulleys with multiple V-shaped grooves or with denticulated pulleys.

Transmission belts such as those described above can be produced as described in the following examples:

Example I

A mixture is prepared from natural rubber (100 parts by weight), carbon black (40 parts) and polyethylene (30 parts), this polyethylene having an average molecular weight of 1,000,000 and being in the form of a fine powder having an average grain size of 100$\mu$, a density of 0.945 and a melting point of 138° C.

This mixture is mixed for 6 minutes at 155° C. in a cylinder mixer. A vulcanizing system including a powerful retarding agent is then added thereto and the mixture is mixed for 4 minutes. During the mixing operation, the polyethylene particles are melted, separated and drawn out into elongated fibrils ca. one micron in diameter and 2 – 20 mm. in length.

The mixture is then drawn out of the mixer in the form of a thin sheet, 0.25 – 0.35 mm. in thickness. This sheet is then cooled under tension to prevent it from contracting longitudinally.

Strips 15 mm. in width are then cut from the sheet in the longitudinal direction of extraction and are helically wound (FIG. 6) on a cylindrical mandrel 10 having the diameter of the belts to be produced. Thus, a first layer 1 comprising contiguous spirals possessing a winding angle of 3° is first formed in one direction on the mandrel and then a second layer 2 possessing contiguous spirals having a winding angle of 3° is then produced in the other direction. A connecting layer of the same width and consisting of a similar mixture to that of the layers 1,2, but lacking the polyethylene can be interposed between the layers 1 and 2. The two layers 1 and 2 can also be directly superposed after the layer 1 has been washed or treated with a hydrocarbon solvent e.g. gasoline. The arrangement is drawn up tight with a fabric belt and then vulcanized for 1 hour and 20 minutes at 140° C. After vulcanization, the belt is removed and a unitary sleeve is obtained in which the layers 1, 2, are bonded together, possibly through the intermediary of the connecting layer 5. This sleeve is then cut into circular sections to form individual endless belts, 15 mm. in width.

In this way, flat transmission belts without a fabric or cord reinforcing sheathing and without a connecting seam are produced having a good structural homogeneity and a homogeneous or regular section over their entire length.

Stress tests carried out using samples of these belts disclose a tensile strength of at least 30 kg/cm$^2$ with an elongation of 1% and a resistance to rupture of 330 kg/cm$^2$ with 5.8% elongation. The belts possess excellent fatigue resistance and they retain their properties of adherence throughout their useful life.

Belts of this type are very suitable for low-power transmission operations involving high speeds, for example, for driving portable electrical tools, bore grinders, or the spindles of machines used in the textile industry.

Example II 30 parts of polyethylene having a high molecular weight similar to that used in Example I are mixed with a "thermoplastic" Clariflex TR 4122 rubber (sequential copolymer of butadiene and styrene) in a cylinder mixer heated to 105° C. The mixture is then worked for 2.5 minutes at a temperature of 156° C. and the mixture is drawn from the mixer in the form of a thin sheet which is cooled under stress (tension). In this state, the product has a tensile strength in the longitudinal direction of drawing of the sheet of 130 kg/cm$^2$ with an elongation of 1%.

Figure 6:
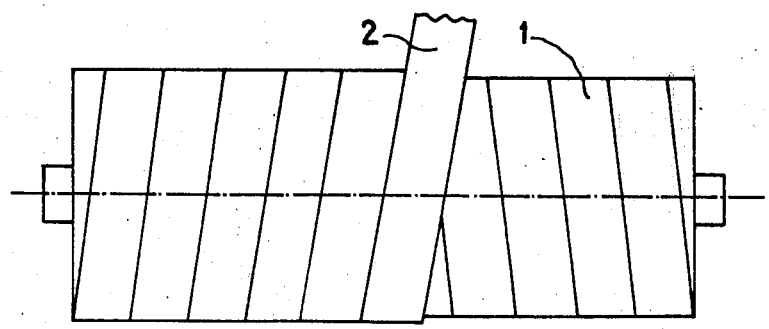
FIG. 6 shows a manufacturing stage of a reinforcing sheathing of the belt according to the invention.

Strips 15 mm. in width are cut in the longitudinal direction of the sheet and helically wound on the cylindrical mandrel 10 to form superposed layers 1 and 2 symmetrically inclined in one direction and then the other, as shown in FIG. 6. The arrangement is drawn together with a fabric belt and heated to a temperature of 100° – 120° C. or to a temperature which is adequate for obtaining the bonding of the layers 1,2, but which is lower than the melting temperature of the reinforcing polyethylene. In this way, a unitary sleeve is obtained from which individual endless belts of desired width may be cut.

Example III

A mixture is produced from vinyl acetate-ethylene copolymer containing 18% vinyl acetate (Alathon resin E. VA. 3170 produced by Du Pont de Nemours) and polyethylene having a high molecular weight similar to Example I of the following composition:

| E. VA 3170 resin | 100 |
|---|---|
| Polyethylene | 30. |

The polyethylene powder is incorporated at a temperature of 120° C. in an open cylinder mixer. The temperature of the cylinders of the mixer is then raised to 148° C. for the mixing operation which takes 28 minutes, at the end of which a 0.2 mm. thick sheet which is cooled under tension is obtained. The product has a tensile strength of 264 kg/cm$^2$ with 1% elongation in the direction of extraction or drawing of the sheet.

Belts are produced in the same manner as described in the preceding Example with strips cut in the longitudinal direction of the sheet.

The invention is not limited to the Examples which have been described from which other variants may be developed, in particular, by replacing the cited elastomers or plastomers by other elastomers (such as styrene-butadiene copolymers, cis-polybutadiene, butadiene and acrylonitrile copolymers, butyl or ethylene-propylene rubbers, etc.) or by other plastomers (such as polyvinylchloride, polyethylene, polystyrene, etc.) and by varying the relative proportions of the constituents of the mixtures.

The production of belts from sheets extracted from the mixer may also be carried out in a different manner. The importance of the process described above is that it enables endless belts to be produced without a connecting seam which are accordingly extremely homogeneous over their entire width. However, when the presence of a connecting seam does not constitute a troublesome disadvantage for the applications in question, the endless belts may be produced by connecting the two ends of the belt by vulcanization or heat bonding or by using other known bonding methods.

It is also possible to obtain belts comprising a plurality of superposed layers by winding the thin sheet which is extracted from the mixer on a cylindrical mandrel, the sheet being wound helically two or three times and the arrangement then being subjected to a heat treatment under pressure to obtain the bonding of the superposed layers produced by helically winding the sheet by vulcanization and/or heat bonding (depending on the material constituting the matrix). Thus, by starting from a sheet wound in this way, it is possible to obtain a sleeve from which individual belts can be cut. It is also possible to directly produce individual belts by starting with strips which have been previously cut from the sheet extracted from the mixer.

The polyolefin fibril-reinforced elastomer and plastomer matrix materials used to form the strip portion of the belts of this invention are described in greater detail in application Ser. No. 330,619, filed on Feb. 8, 1973 and in application Ser. No. 463,186, filed on Apr. 22, 1974, respectively.

While the novel embodiments of the invention have been described, it will be understood that various omissions, modifications and changes in these embodiments may be made by one skilled in the art without departing from the spirit and scope of the invention.

What is claimed is:

1. A transmission belt, having a portion possessing tensile strength that consists solely of a thin, flat strip with no other reinforcing cord or cable, characterized in that said strip comprises at least two thin, superposed layers bonded together and composed of a flexible elastomer or plastomer matrix reinforced with irregular elongated fibrils dispersed in the matrix with a dominant orientation in the longitudinal direction of the strip such that this strip has a tensile strength of at least 20 kg/cm$^2$ with 1% elongation.

2. A transmission belt as claimed in claim 1, wherein the flexible elastomer or plastomer matrix is reinforced with at least 5% by weight of elongated fibrils consisting of a crystalline polyolefin having a high molecular weight which is equal or greater than 500,000.

3. A transmission belt as claimed in claim 2, wherein the reinforcing fibrils of the thin superposed layers are oriented in symmetrical dominant directions forming low angles of less than 10° with respect to the longitudinal direction of the strip.

4. A transmission belt as claimed in claim 2 in which the superposed layers are bonded together through the intermediary of a thin elastomer or plastomer connecting layer containing no reinforcing fibrils.

5. A transmission belt as claimed in claim 2, which is in the form of a thin, flat endless transmission belt.

6. A belt as claimed in claim 2, wherein the portion possessing tensile strength is bonded to an elastomer or plastomer base having a trapezoidal section, a multiple V-shaped section or a denticulated section to allow said belt to cooperate with grooved pulleys or denticulated pulleys.

7. A transmission belt as claimed in claim 1, wherein the reinforcing fibrils of the thin superposed layers are oriented in symmetrical dominant directions forming low angles of less than 10° with respect to the longitudinal direction of the strip.

8. A transmission belt as claimed in claim 7 in which the superposed layers are bonded together through the intermediary of a thin elastomer or plastomer connecting layer containing no reinforcing fibrils.

9. A transmission belt as claimed in claim 7, which is in the form of a thin, flat endless transmission belt.

10. A belt as claimed in claim 7, wherein the portion possessing tensile strength is bonded to an elastomer or plastomer base having a trapezoidal section, a multiple V-shaped section or a denticulated section to allow said belt to cooperate with grooved pulleys or denticulated pulleys.

11. A transmission belt as claimed in claim 1 in which the superposed layers are bonded together through the intermediary of a thin elastomer or plastomer connecting layer containing no reinforcing fibrils.

12. A transmission belt as claimed in claim 11, which is in the form of a thin, flat endless transmission belt.

13. A belt as claimed in claim 11, wherein the portion possessing tensile strength is bonded to an elastomer or plastomer base having a trapezoidal section, a multiple V-shaped section or a denticulated section to allow said belt to cooperate with grooved pulleys or denticulated pulleys.

14. A belt as claimed in claim 1, which is in the form of a thin, flat endless transmission belt.

15. A belt as claimed claim 1, wherein the portion possessing tensile strength is bonded to an elastomer or plastomer base having a trapezoidal section, a multiple V-shaped section or a denticulated section to allow said belt to cooperate with grooved pulleys or denticulated pulleys.

* * * * *